United States Patent Office 3,346,641
Patented Oct. 10, 1967

3,346,641
DIFLUOROAMINO ACETALS AND METHOD OF PREPARATION
Edwin A. Schmall, Springfield, and John R. Lovett, Edison, N.J., assignors to Esso Research and Engineering Company, a corporation of Delaware
No Drawing. Filed Aug. 23, 1961, Ser. No. 135,405
10 Claims. (Cl. 260—584)

This invention relates to the reactions of difluoramine ($HNF_2$) in non-aqueous media with acetals to form new and useful condensation products.

In accordance with the present invention, $HNF_2$ has been found capable of functioning as a strong acid for replacing an alkoxy group ($OR'$) in acetals, which are represented by the following generalized formula:

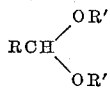

wherein R represents H or an organic radical, such as an alkyl radical, an alkenyl radical, or such radicals having substituents which may be alkoxy groups.

The acetals or reactants useful for the desired condensation reactions with $HNF_2$ are compounds such as the following:

Dimethoxymethane --- $HCH(OCH_3)_2$.
Diethoxymethane --- $HCH(OC_2H_5)_2$.
Diethoxyethane --- $CH_3CH(OC_2H_5)_2$.
1,1,3,3-tetramethoxy-
propane --- $(OCH_3)_2CH \cdot CH_2 \cdot CH(OCH_3)_2$.
Acrolein acetal --- $CH_2{:}CH \cdot CH(OC_2H_5)_2$.
Betaethoxy propional-
dehyde acetal --- $H_5C_2O \cdot CH_2 \cdot CH_2 \cdot CH(OC_2H_5)_2$.

Acrolein acetal is an example of an acetal having an alkenyl (i.e. ethenyl) or unsaturated R radical and an acetal function, which has two alkoxy groups on the same carbon atom.

For the general conditions of reaction of $HNF_2$ with an acetal, reaction temperatures in the range of about 20° C. to 200° C., pressures in the range from subatmospheric to 450 p.s.i.a. or higher and reaction periods of about 1 to 100 hours may be used. The reaction period is shortened as the reaction temperature is increased. The reactants are supplied to the reaction zone to form a starting mixture of at least one mole $HNF_2$ per mole of the acetal reactant and may range up to 10 or more moles of $HNF_2$ per mole of acetal reactant.

To improve contact of the reactants and for safety, various solvents for the $HNF_2$ may be used as reaction media. Suitable solvents for these purposes are liquid compounds which remain inert or undecomposed and which can be separated from the products. Examples of suitable unreactive solvents are monoglyme, which is the dimethyl ether of ethylene glycol having the formula $CH_3OCH_2CH_2OCH_3$, tetrahydrofuran, acetic anhydride, sulfuric acid, other unreactive glycol ethers, etc.

$HNF_2$ has been reacted with a number of different acetals to form condensation products in accordance with the present invention, as illustrated in the following examples:

Example I 1,1,3,3-tetramethoxypropane was reacted with $HNF_2$ by charging a ratio of 4 moles of $HNF_2$ per mole of the acetal into a glass bulb reactor under subatmospheric pressure at 50° C. At the end of a period of 65 hours, the resulting liquid product was removed from the reactor and fractionated into 2 cuts, A and B. Gas chromatography indicated three components in each cut, one of the components in each cut being methanol. No unreacted tetramethoxypropane was detected by infrared analysis or gas chromatography analysis. Infrared and elemental analysis indicated products having $NF_2$ groups, in both cuts. The fact that a mixture was obtained suggests that the extent of replacement of methoxy groups by $NF_2$ groups is variable. The analytical results are tabulated as follows:

TABLE 1.—ELEMENTAL ANALYSIS OF PRODUCTS FROM TETRAMETHOXYPROPANE-$HNF_2$ REACTION

|  | N percent | F percent | F/N Atomic Ratio |
|---|---|---|---|
| Found, Cut A | 9.1 | 24.2 | 2.0 |
| Found, Cut B | 14.5 | 35.0 | 1.80 |

|  | No. $CH_3O$ Groups Replaced | | | |
|---|---|---|---|---|
|  | 1 | 2 | 3 | 4 |
| Percent N, Theory | 7.6 | 13.6 | 18.5 | 22.6 |
| Percent F, Theory | 20.5 | 36.9 | 50.3 | 61.3 |

The elemental analysis given in the foregoing table indicates that the ratio of fluorine to nitrogen is of the proper order of magnitude for $NF_2$ groups replacing from 1 to about 2 methoxy groups per molecule of the tetramethoxypropane and thereby forming products such as mono(difluoramino)trimethoxypropane and bis(difluoramino)diethoxypropane.

Example II

Tetramethoxypropane (500 mg., 0.003 mole) was reacted for 3 days at room temperature (23° C.) with $HNF_2$ (420 mg., 0.008 mole) in one cc. of ethylene glycol dimethyl ether. After pumping off the solvent and unreacted $HNF_2$, there is attained a good yield of water white liquid on analysis showed replacement of one methoxy group by an $NF_2$ group. The elemental analysis is tabulated as follows:

Table 2.—Analysis of tetramethoxypropane-$HNF_2$ reaction product

Calc. $C_6H_{13}O_3NF_2$: N, 7.5 percent; F, 20.5 percent.
Found: N, 6.5 percent; F, 19.8 percent.

Infrared analysis indicated the presence of the C—$NF_2$ group and thus confirmed the formation of the product mono(difluoramino)trimethoxypropane.

A comparison of the conditions and products obtained in Examples I and II indicates that by increasing the temperature, reaction toward replacement of more than one of the alkoxy groups is obtained. Either the mono- or bis-difluoramino derivative of the tetramethoxypropane is useful as an energetic component for oxidizing rocket propellant fuel materials, e.g. powdered aluminum, powdered boron, and hydrocarbon moieties. These compounds in having the hydrolyzable alkoxy groups are useful as cross-linking agents or as copolymerizing agents.

The reaction of another variety of acetals with $HNF_2$ is illustrated in the following example:

Example III 0.35 g. of $HNF_2$ (6.6 mmoles) was condensed with 0.34 g. of acrolein diethylacetal (2.6 mmoles) in a glass flask. The reactants were then heated to 120° C. for 2 hours. The pressure decrease correspond to a consumption of approximately 2.5 mmoles of $HNF_2$. A liquid product was isolated by distilling off the excess $HNF_2$. Since a noticeable amount of the acetal apparently polymerized, it appears that at least one mole of $HNF_2$ had reacted for each mole of acetal. The precise ratio could not be determined. An infrared spectrum of the liquid product indicated $NF_2$, OH, and a decrease in either groups, compared with acrolein diethylacetal.

The mass spectrum of the gas over the reaction indicated the presence of $C_2H_5OH$. Gas chromatography revealed one major product with a retention time (on silicone substrate) between acrolein diethylacetal and the $N_2F_4$-adduct of acrolein diethylacetal.

Analyses indicated replacement of one alkoxy group by $NF_2$.

Calculated:[1] F, 27.7 percent; N, 10.2 percent. Found: F, 23.9 percent; N, 10.13 percent.

The reaction of this unsaturated acetal with $HNF_2$ indicates a tendency for the condensation reaction to occur under mild conditions thus forming a product which has a carbon to carbon double bond. The resulting product represented by the formula $$CH_2:CH \cdot CH(OC_2H_5)(NF_2)$$

may be used as a starting material for reaction with $N_2F_4$ for addition of $NF_2$ groups to the double bonded carbons thus providing a higher energy value oxidizer for use as a propellant ingredient.

As shown, the $HNF_2$ condensation reaction with acetals is particularly useful on acetals containing 3 to about 8 or more carbon atoms to obtain condensation products represented by the formula:

$$RCH(OR')(NF_2)$$

in which OR' is an alkoxy group, $NF_2$ is a difluoramino group attached to the same carbon atom as is (OR'), and R is selected from the group consisting of H, alkyl radical, alkenyl radical, and of said radicals having an alkoxy substituent, dialkoxy substituents, and of both alkoxy and difluoramino substituents.

What is claimed:
1. Difluoramino substituted acetal having the formula:

$$RCH(OR')(NF_2)$$

wherein (OR') is an alkoxy group, $NF_2$ is a difluoramino group attached to the same carbon as is (OR') and R is selected from the group consisting of H, alkyl radical, alkenyl radical, and said radicals having an alkoxy substituent.

2. Difluoramino trimethoxy propane having the formula:

$$(OCH_3)_2CH \cdot CH_2 \cdot CH(OCH_3)(NF_2)$$

[1] For $C_5H_9ONF_2$.

3. Bis(difluoramino) dimethoxy propane having the formula:

$$(NF_2)(OCH_3)CH \cdot CH_2 \cdot CH(OCH_3)(NF_2)$$

4. Difluoramino ethoxy acrolein having the formula:

$$H_2C:CH \cdot CH(OC_2H_5)(NF_2)$$

5. Process of substituting an $NF_2$ group for an alkoxy group (OR') in an acetal having the formula:

$$RCH(OR')_2$$

wherein R is selected from the group consisting of H, alkyl radical, alkenyl radical, and said radicals having alkoxy substituents, which comprises reacting the acetal with $HNF_2$ in a reaction mixture containing 1 to 10 moles of $HNF_2$ per mole of the acetal at a reaction temperature in the range of about 20° to 200° C. under a pressure sub-atmospheric to 450 p.s.i.a. until a product is formed having at least an $NF_2$ substituted for one of the (OR') groups in the acetal, then recovering as products an alcohol having the composition R'OH and the acetal conversion product containing an $NF_2$ group substituted for at least one (OR') group.

6. The process of claim 5, wherein the reaction of the acetal with the $HNF_2$ is carried out in the presence of an organic diluent that remains unchanged.

7. The process of claim 5, wherein the reaction is carried out in ethylene glycol dimethyl ether.

8. The process of claim 5, wherein the reaction is carried out in the presence of an unreactive glycol ether.

9. The process of claim 5, in which the acetal is tetramethoxypropane having the formula:

$$(H_3CO)_2CH \cdot CH_2 \cdot CH(OCH_3)_2$$

10. The process of claim 6, in which the acetal is acrolein acetal having the formula:

$$H_2C:CH \cdot CH(OC_2H_5)_2$$

References Cited

UNITED STATES PATENTS 3,310,444    3/1967    Gould et al. _____ 260—583 X

CHARLES B. PARKER, *Primary Examiner.*

R. L. CAMPBELL, L. D. ROSDOL, *Examiners.*

J. W. WHISLER, R. L. RAYMOND,
*Assistant Examiners.*